(12) United States Patent
Colasanto

(10) Patent No.: US 12,410,340 B1
(45) Date of Patent: Sep. 9, 2025

(54) BREATHABLE COATING COMPOSITIONS

(71) Applicant: Brookwood Companies Incorporated, New York, NY (US)

(72) Inventor: Thomas Colasanto, Tolland, CT (US)

(73) Assignee: BROOKWOOD COMPANIES INCORPORATED, New York, NY (US)

( * ) Notice: Subject to any disclaimer, the term of this patent is extended or adjusted under 35 U.S.C. 154(b) by 381 days.

(21) Appl. No.: 16/657,968

(22) Filed: Oct. 18, 2019

Related U.S. Application Data

(60) Provisional application No. 62/748,249, filed on Oct. 19, 2018.

(51) Int. Cl.
  *C09D 175/04* (2006.01)
  *B32B 37/00* (2006.01)
  *B32B 37/12* (2006.01)

(52) U.S. Cl.
  CPC .......... *C09D 175/04* (2013.01); *B32B 37/025* (2013.01); *B32B 37/12* (2013.01); *B32B 2264/0292* (2013.01)

(58) Field of Classification Search
  CPC ..... C09D 175/04; B32B 37/025; B32B 37/12; B32B 2264/0292
  See application file for complete search history.

(56) References Cited

U.S. PATENT DOCUMENTS

| | | | | |
|---|---|---|---|---|
| 5,869,593 A * | 2/1999 | Helmeke | | B32B 27/40 528/80 |
| 6,701,971 B1 * | 3/2004 | Sollars, Jr. | | D06N 3/186 442/205 |
| 7,651,118 B1 * | 1/2010 | Veiga | | D06N 3/08 280/743.1 |
| 9,903,069 B2 * | 2/2018 | Hong | | D06N 3/0088 |
| 2003/0112311 A1 * | 6/2003 | Naik | | B32B 7/12 347/105 |
| 2003/0203991 A1 * | 10/2003 | Schottman | | C09D 7/61 523/334 |

(Continued)

FOREIGN PATENT DOCUMENTS

CN  206070215 U  * 4/2017

OTHER PUBLICATIONS

CN206070215U—machine translation (Year: 2017).*
U.S. Appl. No. 16/657,948, filed Oct. 18, 2019 (Not published).

*Primary Examiner* — Michael N Orlando
*Assistant Examiner* — Abhishek A Patwardhan
(74) *Attorney, Agent, or Firm* — Greenberg Traurig, LLP

(57) ABSTRACT

Coating compositions and the use thereof are provided for the coating of substrates which provide increased and durable breathability and/or waterproofness to substrates coated with cured films produced therefrom. These increased benefits are achieved through the formation of cured coating films comprising polyurethane domains with specific polymers interspersed between the domains. The polyurethane and secondary polymer are able to interact to form these unique films through the selection of specific polymers with complimentary solvent characteristics coupled with specific attractions between the polyurethanes and polymers. Preferred polymers include polyethylenimine and anionic polyurethanes (e.g., polycarbonate polyurethanes, polycarbonate polyether polyurethanes, etc.).

20 Claims, 3 Drawing Sheets

(56) References Cited

U.S. PATENT DOCUMENTS

2007/0249746 A1* 10/2007 Rische .................. C08G 18/44
                                                       521/172
2013/0316098 A1    11/2013 Lubnin
2014/0030528 A1*   1/2014 Kitagawa ............. C08G 18/792
                                                       428/407
2015/0266327 A1*   9/2015 Zama .................. B41M 5/5218
                                                       524/507
2015/0353768 A1*  12/2015 Yamada ................. C09D 5/02
                                                       524/591

* cited by examiner

BREATHABLE COATING COMPOSITIONS

CROSS REFERENCE TO RELATED APPLICATIONS

The present application claims the benefit of priority under 35 U.S.C. § 119 to U.S. App. No. 62/748,249, filed Oct. 19, 2018, which is hereby incorporated by reference in its entirety.

FIELD OF INVENTION

Coating compositions and the use thereof are provided for the coating of substrates to provide high moisture vapor permeability to coated substrates. The cured films made from these coating compositions are able to provide increased moisture vapor permeability without sacrificing other features of the film such as waterproofness.

BACKGROUND OF INVENTION

The manipulation of surface properties via the application of coatings is well known. For example, the surface of a substrate may be coated with a polymeric film which prevents migration of water to the substrate. Accordingly, waterproof polymeric films are often used to coat substrates (e.g., fabrics, etc.) in order to provide increased waterproof character of the composite material. However, these waterproof composite materials are often hindered by lack of water vapor migration (or breathability) through the waterproof film. In the case of waterproofing fabrics, this decreased water vapor migration is known to decrease the comfort of the coated fabric. Coatings therefore have been developed which are able to simultaneously provide waterproofness and increased moisture vapor transmission in coated substrates.

Waterproof, moisture vapor permeable (breathable) coatings have become ubiquitous in several industries due to the ability to produce coated substrates with both increased waterproofness and with increased comfort due to enhanced breathability characteristics. For example, textiles may be coated with such compositions to produce outdoor garments, such as sportswear, activewear (e.g., light jackets, jogging suits, skiwear, etc.), and heavy duty rainwear, industrial clean room garments, fluid barrier medical garments (e.g., surgical garments, bedsheets, surgical drapes, etc.), protective military garments, camping materials (e.g., tents, sleeping bags, etc.), wound dressings, protective marine vehicle covers, airbags, natural and synthetic leather coatings, glove inserts, and shoe insulation.

There are several types of polymeric coatings capable of providing these waterproof and breathable characteristics to surfaces. Hydrophilic monolithic coatings are solid films impermeable to water but permeable to water vapor. These beneficial film characteristics stem from the specific design of monolithic coating molecular structure. Microporous coatings provide breathability due to the presence of tiny pores present in the films. The pores of microporous coatings are dimensioned to permit passage of water vapor while the pores are small enough to preventing the passage of liquid water through the film. Hydrophilic groups in polymer films also may transmit water vapor through solid regions of the film via water vapor migration along chain of the polymer. Typically, these coatings consist of polymers composed of hard, relatively hydrophobic segments, e.g., polyurethane, and soft, relatively hydrophilic, e.g., polyether, segments. Composite coated substrates utilizing these polyurethane coatings to increase the breathability or moisture vapor transmission rate ("MVTR") have various levels of hydrophilicity based on the amount of these hydrophilic moieties.

Typically, monolithic polymeric films may be prepared via the loss of organic or aqueous media in a dispersion of the of the polymeric film former (e.g., polyurethane, etc.). When relatively thin films of these systems are created and cast upon a substrate, the liquid solvent media may leave the film through processes like evaporation or forced drying. As the liquid media is removed from the system, the polymeric film forming particles first form into close packed structure which is followed by coalescence of the polymer into a smooth continuous film.

These smooth continuous films are often plagued by low breathability. In polyurethane based polymeric films, breathability typically come at the expense of other properties like waterproofness. Hydrophilic monolithic coatings made from polyether polyurethanes are waterproof and breathable. However, these films also have poor oxidation resistance due to the presence of the polyether groups of the polyurethane which are susceptible to chemical degradation. Polyester polyurethanes, on the other hand, exhibit good toughness, abrasion resistance and oxidation resistance, but have decreased hydrolytic stability. Polyurethanes based on polycarbonate polyols are a class of polyurethane offering a bridge between these properties such that polycarbonate polyurethanes are known to have good hydrolytic stability and generally have a good resistance to other degradation forces (e.g., oxidative resistance, etc.). Nevertheless, these properties are often sacrificed in attempts to make films of these materials more breathable. Accordingly, none of the classes of polyurethanes provide long lasting benefits since the waterproof while breathable benefit is diminished as the film degrades over time. This film degradation is particularly detrimental when surfaces coated with breathable polyurethane films are cleaned (e.g., machine washed) one or more times.

SUMMARY

In accordance with the foregoing objectives and others, the present invention provides coating compositions, methods of producing them, cured films prepared from the compositions, and substrates (e.g., fabrics, etc.) coated with these compositions. In some implementations, the coated compositions are employed to provide a film or coating on a substrate, such as a porous substrate, and in particular, a textile. In some implementations, textiles (e.g., fabrics, etc.) coated with the compositions of the present invention may exhibit high breathability (e.g., as measured by moisture vapor transmission rate, etc.) and high water resistance or waterproofness.

The coating compositions generally comprise a primary and secondary polymer. The primary polymer is typically one which can provide a substantially continuous film coating on a surface or substrate. In some embodiments, the primary polymer is one which does not result in a breathable film or coating when applied to a substrate in the absence of the secondary polymer. In specific non-limiting embodiments, the primary polymer may be a polyurethane including a polyurethane latex. In some embodiments, the coating composition for forming a polymeric coating on a substrate may comprise:

(a) a polymeric film former dispersed in a liquid media, and
(b) a secondary polymer;

wherein the secondary polymer is present in an amount to increase the moisture vapor transmission rate of a film produced (e.g., the film produced by curing the coating composition on a substrate such as nylon) from the coating composition as compared to an otherwise identical film produced from a coating composition without the secondary polymer.

The secondary polymer may be a hydrophilic polymer, and in particular one containing heteroatoms (e.g., oxygen or nitrogen) capable of hydrogen bonding to water molecules. In one embodiments, the secondary polymer is polyethyleneimine. The secondary polymer is preferably present in an amount sufficient to increase the moisture vapor transmission rate of a resultant film coated fabric as compared to an otherwise identical film coated fabric without said secondary polymer. It has surprisingly been found that addition of the secondary polymer may improve (e.g., increase) moisture vapor transmission through the films. In some embodiments the secondary polymer is not a porosity forming agent.

Incorporation of the secondary polymer into primary polymer coating compositions permits increased breathability of cured films. The secondary polymer may comprise one or more groups such as hydroxides, carboxylic acids, amides, or amines to aid migration of water through the film. In some embodiments, the secondary polymer is a hydrophilic polymer. In certain embodiments, the hydrophilic polymer comprises monomer groups with hydrophilic moieties such as —NH—, —O—, —OH, —NHCO—, —NH$_2$, cyclic amides (e.g., lactams like pyrollidone, etc.), or combinations thereof. In certain embodiments, the secondary polymer is selected from polyethyleneimine, polyethyleneoxide, polyvinyl alcohol, polyacrylacrylate, or polyvinyl lactam (e.g., polyvinyl pyrollidone, etc.). In some embodiments, the secondary polymer is hydrophilic and the liquid media of the coating composition is aqueous or water.

In some embodiments, the liquid media comprises water. In certain implementations, a major portion of the media comprises water (e.g., said media comprises at least 50% water or at least 75% water or at least 90% or at least 95% water by weight of said polymeric film former dispersed in a liquid media, etc.).

In preferred embodiments, the secondary polymer is polyethyleneimine. Additionally, the size and structure of the secondary polymer may be used to alter the benefits provided to the resultant film. For example, in some embodiments, the secondary polymer has molecular weight of greater than 100,000 g/mol.

The Coating Composition for Forming a Polymeric Coating on a Substrate May Comprise:

(a) a dispersion of polyurethane particles in a liquid media (e.g., water, etc.), wherein said polyurethane particles are present in said dispersion in an amount sufficient to coalesce to form a continuous film upon removal of said solvent (e.g., by evaporation, including forced evaporation, etc.); and
(b) a secondary polymer comprising moieties attracted to the liquid media (e.g. moieties that have a polarity similar to the liquid media), wherein the secondary polymer is soluble or dispersible in the liquid media. In preferred embodiments, the liquid media is aqueous or water.

Cured films prepared from the removal of the solvent in these coating compositions are typically characterized by increased breathability as compared to films prepared from the polymeric film former. In some embodiments, the cured films may be characterized as having increased breathability while maintaining the benefits of the polymeric film former such as resistance to chemical degradation, waterproofness, hydrolytic resistance, weldability, and the like. Utilization of the secondary polymer in coating compositions allows the film prepared therefrom to retain or substantially retain certain properties of polymeric films made without the secondary polymer (e.g., hydrolytic resistance, waterproofness, weldability, etc.). For example, coating compositions comprising polycarbonate polyurethane are known to produce films waterproofness but poor breathability. However, cured films of coating compositions comprising polycarbonate polyurethanes and one or more secondary polymers may be characterized as having similar (e.g., within about ±30%, within about ±20%, within about ±10%, etc.) or substantially similar waterproofness, and increased breathability as compared to an otherwise identical film not comprising the secondary polymer. In some embodiments, the cured film may be a monolithic coating. In certain embodiments, the cured film may be non-porous or have a low porosity for air.

Methods of Coating Substrates are Also Provided Comprising:

(a) spreading a coating composition comprising polyurethane and a secondary polymer onto a transfer sheet;
(b) curing coating composition on the transfer sheet;
(c) removing the transfer sheet from the cured coating composition; and
(d) attaching the cured coating composition to said substrate with an intermediate adhesive layer between said cured coating composition and said substrate.

Methods of manufacturing the coating composition are also provided comprising combining a dispersion of polyurethane particles with an aqueous solution of the secondary polymer.

DETAILED DESCRIPTION

Figure 1A:
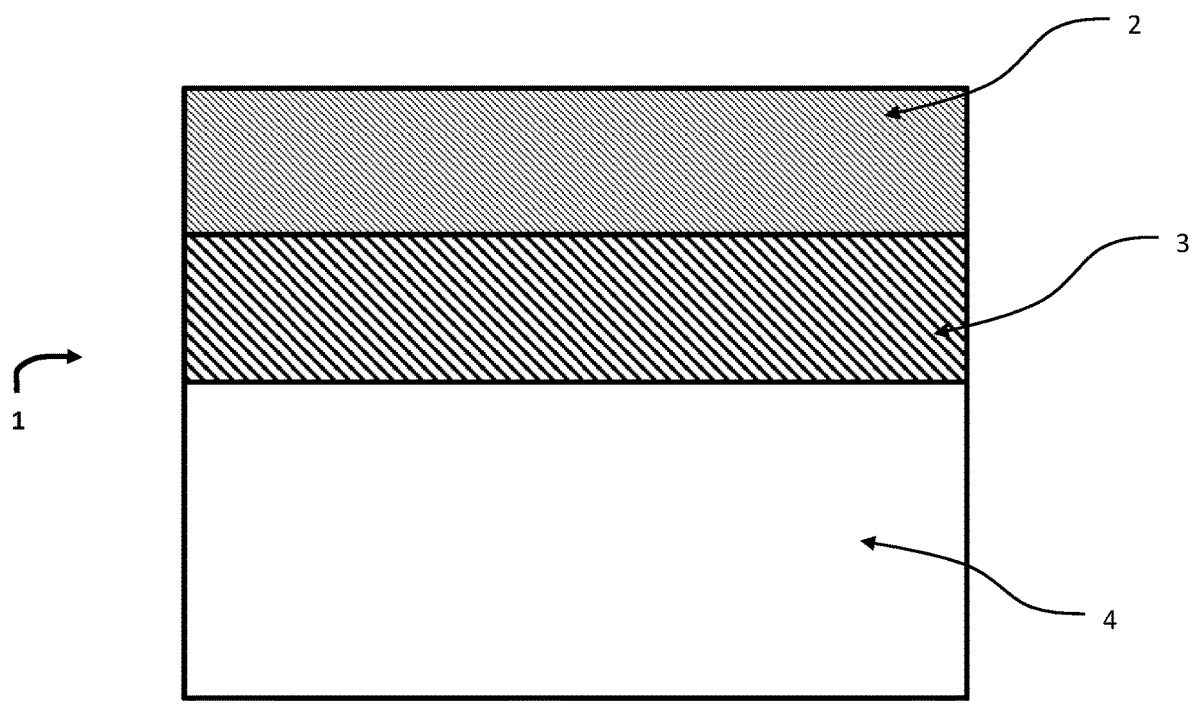
FIG. 1A shows the cross section of a polyether polyurethane coated fabric (1).

Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive.

All terms used herein are intended to have their ordinary meaning in the art unless otherwise provided. All concentrations are in terms of percentage by weight of the specified component relative to the entire weight of the topical composition, unless otherwise defined.

As used herein, "a" or "an" shall mean one or more. As used herein when used in conjunction with the word "comprising," the words "a" or "an" mean one or more than one. As used herein "another" means at least a second or more.

As used herein, all ranges of numeric values include the endpoints and all possible values disclosed between the disclosed values. The exact values of all half integral numeric values are also contemplated as specifically disclosed and as limits for all subsets of the disclosed range. For example, a range of from 0.1% to 3% specifically discloses a percentage of 0.1%, 1%, 1.5%, 2.0%, 2.5%, and 3%. Additionally, a range of 0.1 to 3% includes subsets of the original range including from 0.5% to 2.5%, from 1% to 3%, from 0.1% to 2.5%. It will be understood that the sum of all weight % of individual components will not exceed 100%.

By "consist essentially" it is meant that the ingredients include only the listed components along with the normal impurities present in commercial materials and with any other additives present at levels which do not affect the operation of the invention, for instance at levels less than 5% by weight, typically less than 1% or even 0.5% by weight. For example, polyurethane particles that consist essentially of one or more specific polyurethanes (e.g., polycarbonate polyurethane and/or polyether polyurethane, etc.) may have more than 90% or more than 95% of the one or more specific polyurethanes by weight of the polyurethane particles.

The term "flexible substrate" refers to a substrate that can undergo mechanical stresses, such as bending, stretching and the like without significant irreversible change. In certain embodiments, the flexible substrates are compressible substrates, as described above. Other flexible substrates include non-rigid substrates, such as woven and nonwoven fiberglass, woven and nonwoven glass, woven and nonwoven polyester, thermoplastic urethane (TPU), synthetic leather, natural leather, finished natural leather, finished synthetic leather, rubber, urethane elastomers, synthetic textiles and natural textiles. "Textiles" can include natural and/or synthetic textiles such as fabric, vinyl and urethane coated fabrics, mesh, netting, cord, yarn and the like, and can be comprised, for example, of canvas, cotton, polyester, KEVLAR, polymer fibers, polyamides such as nylons and the like, polyesters such as polyethylene terephthalate and polybutylene terephthalate and the like, polyolefins such as polyethylene and polypropylene and the like, rayon, polyvinyl polymers such as polyacrylonitrile and the like, other fiber materials, cellulosics materials and the like.

The term "crosslinker" or "crosslinking agent" refers to compounds which are capable of effecting crosslinking of the polymeric film former. It will be understood that the secondary polymer may provide some crosslinking of the polymeric film former as well, although the secondary polymer is not considered a part of any crosslinking agents or crosslinking systems described herein.

By "substantially similar" in relation to a characteristic of two films it is meant that each film may still characterized with the same characteristic. For example, a "substantially similar" property of two films means measured parameters of that property (e.g., waterproofness, degradation resistance) may vary by less than 20% (e.g., less than 10%, less than 5%, etc.) when measured on each film.

The coating compositions may be applied to flexible substrates, including, but not limited to textiles, in any desired thickness such as a thickness suitable to achieve a desired mechanical and/or visual effect. In one non-limiting embodiment, the coatings may seep into a portion of the surface of the flexible substrate while maintaining a coating on the exterior surface of the flexible substrate. In other embodiments, the coating may be adhesively attached to the surface of the flexible substrate. In certain embodiments, the exterior surface of the flexible substrate is coated all or in part. By "exterior surface" is meant a surface that is at least partially exposed upon assembly of the flexible substrate into a finished product. Examples related to the use of textiles include the exterior surface of an article of clothing or the exterior surface of a floor covering.

The coating compositions generally comprise a primary and secondary polymer. In most embodiments, the primary polymer is a polymeric film former. In some embodiments, the secondary polymer is hydrophilic. Without wishing to be bound by theory, it is believed that the secondary polymer intercalates into the film formed by the primary polymer (e.g., a polyurethane such as polycarbonate polyurethane polyether polycarbonate polyurethane and the like) to provide pathways for water molecules to migrate (e.g., through hydrogen bonding, through wicking, etc.) through the coating layer formed by the coating composition. Such intercalation may allow for increased moisture vapor transmission rates in an otherwise non breathable film.

The primary polymer may be a hydrophobic polymer. In some embodiments, the primary polymer is a polymeric film former. Polymeric film forming component may comprise various emulsifiable, synthetic polymers employed in aqueous coating compositions. Such polymers may include those obtained by addition polymerization of vinyl monomers, e.g., styrene, methyl styrene, divinylbenzene, and other vinyl aromatics, acrylic acids and esters, substituted acrylic acids and esters, vinyl halides, vinyl esters, etc. Examples of suitable film-formers include polystyrene, styrene-acrylic acid copolymers, ethylacrylate-acrylic acid copolymers, ethyl acrylate-methacrylic acid copolymers, styrene-methacrylic acid polymers, etc. In some embodiments, the film former may be a carboxyl group-containing polymer such as those composed of polymerized acrylic acid, methacrylic acid, itaconic acid, etc.

The polymerization systems employed to produce the polymeric film-former may be those systems wherein addition polymerization (including 00— or interpolymerization) is effected in the presence of an emulsion polymerization catalyst, emulsifiers and water. These systems may have the advantage of preparing an already emulsified polymeric film former, which emulsion, after treatment, say, to remove or quench unexpired catalyst, may be used directly in formulating the coating composition.

The polymeric film former may be a polyurethane. Polyurethanes that can be used in the coating compositions of the present invention and methods of preparing them are well known in the art. For example, the polyurethane can be prepared by reacting a polyester polyol, polycarbonate polyol, polyether polyol or acrylic polyol with a polyisocyanate and an acid functional polyol such that the OH/NCO ratio is greater than 1:1, neutralized with an amine then dispersed into water. Alternately, the polyurethane can be prepared by reacting said polyol, isocyanate and acid functional polyol with an isocyanate such that the OH/NCO equivalent ratio is less than 1:1, dispersing the prepolymer in water containing an isocyanate chain extender and a neutralizing amine. Suitable polyisocyanates include aliphatic polyisocyanates, aromatic polyisocyanates, and mixtures thereof.

The polyurethane particles may comprise one or more types of polyurethane particles. In some embodiments, the coating composition may comprise anionic polyurethane. In some embodiments, the anionic polyurethane comprises carboxylate groups, ether groups, sulfonate groups, or combinations thereof. The polyurethane particles may comprise aliphatic polyurethane. Preferably, the polyurethane particles comprise polycarbonate moieties (e.g., aliphatic polycarbonate polyurethane, polycarbonate polyether polyurethane, aliphatic polycarbonate polyether polyurethane, etc.). In some embodiments, the polyurethane particles comprise polycarbonate moieties and polyether moieties. In preferred embodiments, the polyurethane is the product of the reaction of isocyanate-functional prepolymer with an isocyanate-reactive compounds comprising a polycarbonate diol and/or a polyether diol. Accordingly, the coating composition may comprise polycarbonate polyurethane particles and/or polycarbonate polyether polyurethane particles. In certain embodiments, the polyurethane particles consist essentially of polycarbonate polyurethane particles and/or polycarbonate polyether polyurethane particles. Exemplary polyurethane dispersions suitable for creation of the coating composition include Impranil® DLC-F, Impranil® DLU, and Impranil® DLV/1 polyurethane dispersions available from Covestro®.

The secondary polymer used in connection with the polymeric film former (e.g., polyurethanes, etc.) allows for the increased benefit of these compositions. The secondary polymer comprises moieties attracted to the polyurethane solvent (e.g. moieties that have a polarity similar to the solvent such as hydrophilic and/or oleophilic moieties), and the secondary polymer is soluble or dispersible in the solvent. For example, cationic polymers may be used in conjunction with waterborne polyurethanes. In some embodiments, the secondary polymer comprises monomer units comprising primary and secondary amine groups. In some embodiments, the secondary polymer comprises monomer units comprising primary, secondary, and tertiary amine groups.

Other cationic polymers include polyethylenimines and its derivatives and polyamidoamine-epichlorohydrin (PAE) resins. In one aspect, the polyethylene derivative may be an amide derivative of polyethylenimine sold under the trade name Lupasol SK. Also included are alkoxylated polyethylenimine; alkyl polyethylenimine and quaternized polyethylenimine. These polymers are described in Wet Strength resins and their applications edited by L. L. Chan, TAPPI Press (1994). The weight-average molecular weight of the polymer will generally be from 1,000 g/mol to 5,000,000 g/mol, or from 100,000 g/mol to 200,000 g/mol, or from 200,000 g/mol to 1,500,000 g/mol or greater than 1,000 g/mol or greater than 10,000 g/mol or greater than 50,000 g/mol or greater than 500,000 g/mol or between 500,000 g/mol and 1,000,000 g/mol. Molecular weights may be measured by, for example, static light scattering.

The interaction between the polyurethane and the secondary polymer is an essential aspect of this invention. In certain embodiments, secondary polymers with opposite charge from the polyurethane (e.g., anionic polyurethane and cationic secondary polymer, etc.), the interaction may be controlled by electrostatic interaction between these polymers. The attraction between these polymers may cause gelation of the composition. In some embodiments, this gelation may be mitigated through the incorporation of anti-gelation agents which counteract the attraction between the polyurethane and secondary polymer. For example, when the secondary polymer is has cationic groups (e.g., polyethylenimine, etc.), the compositions may comprise ammonium salts (e.g., ammonium carbonate, ammonium chloride, ammonium hydroxide, ammonium nitrate, etc.). In certain embodiments, the coating composition comprises 0.1% to 5% of these anti-gelation agents (e.g., ammonium salt, etc.) by weight of the composition. In some embodiments, the weight ratio of the secondary polymer and anti-gelation agent (e.g., ammonium salt, etc.) is between 10:1 and 1:10 (e.g., 5:1 and 1:5, 3:1 and 1:3, 2:1 and 1:2, 10:1 and 1:1, 5:1 and 1:1, etc.).

Typically, aqueous compositions are formulated at a pH where the polyurethane does not need further stabilization. In some embodiments, the coating composition is basic. In some embodiments, the coating composition has a pH greater than 7 (e.g., greater than 9, between 8.5 and 11.5, etc.).

Additionally, the final cured structure and benefits thereof may be controlled through various relative ratios of secondary polymer and polyurethane. In some embodiments, the weight ratio of polyurethane particles to secondary polymer is between 150:1 to 1:1 or between 100:1 to 10:1. In some embodiments, the composition comprises from 30% to 99% (e.g., 50% to 95%, etc.) polyurethane by weight of the composition. In some embodiments, the comprises 0.1 to 20% (e.g., 0.1% to 10%, etc.) secondary polymer by weight of the composition. In certain embodiments, the composition comprises:

(a) 30% to 99% polyurethane by weight of the composition; and (b) 0.1 to 20% secondary polymer by weight of the composition.

The coating compositions may further comprise a cross-linking agent. Crosslinking may take place with certain reactive groups such as, for example, isocyanate, isocyanurate and/or melamine groups. As crosslinkers, it is possible to incorporate inorganic crosslinkers such as those based on zirconium compounds, such as ammonium zirconium carbonate, organometallic crosslinkers such as those based on organotitanate (e.g., diisopropyl ditriethanolaminotitanate, etc.), those based on organozirconate, organic crosslinkers such as adipic dihydrazide, those based on aziridine such as polyfunctional polyaziridine, those based on an azo compound, those based on diamine, those based on diimide such as multifunctional polycarbodiimides such as those based on formaldehyde (e.g., urea-formaldehyde, melamine-formaldehyde, etc.), those based on imidazole such as 2-ethyl-4-methylimidazole, those based on isocyanate, those based on isocyanurate, those based on melamine such as methoxymethyl-methylol-melamine and/or hexamethoxymethyl-melamine, those based on peroxide, those based on triazine such as tris(alkoxycarbonylamino)triazine, those based on triazole and combinations thereof. In certain embodiments, the crosslinker is polyfunctional polyaziridine.

Useful crosslinkers further include polyvalent metal ions capable of forming ionic crosslinks. Examples of such crosslinkers are magnesium, calcium, barium and aluminum ions. These crosslinkers are used for example as hydroxides, carbonates or bicarbonates. Useful crosslinkers further include multifunctional bases likewise capable of forming ionic crosslinks, for example polyamines or their quaternized salts. Examples of polyamines are ethylenediamine, diethylenetriamine, triethylenetetramine, tetraethylenepentamine, pentaethylenehexamine and polyethylenimines and also polyamines having molar masses in each case of up to 4,000,000 g/mol. In some embodiments, the larger polymer crosslinkers may also serve as secondary polymers. In other embodiments, the compositions may comprise a secondary polymer with some crosslinking function (e.g., polyethylenimine, etc.) and another crosslinker (e.g., polyfunctional aziridine, etc.). In some embodiments, the crosslinkers are present in the reaction mixture from 0.001 to 50% (e.g., 0.01 to 25%, etc.) by weight of the composition.

For example, the coating compositions may also comprise carbodiimide crosslinker, and when appropriate, water dispersible carbodiimide crosslinkers. "Water dispersible" and like terms, when used in conjunction with carbodiimide, refer to carbodiimide dissolved or dispersed in aqueous phase. In order to utilize certain carbodiimides in the aqueous embodiments of the coating compositions, it may be necessary to modify the carbodiimides to make them water dispersible. Techniques for modifying carbodiimides to make them water dispersible are well known in the art.

Suitable water dispersible carbodiimide crosslinkers include an aliphatic and/or aromatic dinitrogen analogue of carbonic acid of the generalized structure: $RN=C=NR_1$ where R and $R_1$ are independently hydrogen, aliphatic or aromatic groups. The aliphatic groups comprise alkyl chains and can include a carbodiimide such as dicyclohexyl carbodiimide. Oligomeric or polymeric carbodiimide crosslinkers can also be used. Suitable water dispersible carbodiimide crosslinkers can be prepared by incorporating minor amounts of an amine, such as dimethyl aminopropylamine, and an alkyl sulfonate or sulfate into the carbodiimide structure. Suitable water dispersible carbodiimides can also be prepared by incorporating polyethylene oxide or polypropylene oxide into the carbodiimide structure. Suitable water dispersible carbodiimides are commercially available. For example, ZOLDINE XL-29SE, XL-20 commercially available from Angus Chemical Co. and CARBODILITE VO2-L2 commercially available from Nisshinbo Industries, Inc. can be used in the present invention.

The amount of the dispersed carbodiimide in the solvent (e.g., aqueous solvent, etc.) can be at least 1 percent by weight based on the weight of the aqueous dispersion, such as from 0.1% to 60% based on the weight of the aqueous dispersion. In waterborne coating compositions, the water dispersible crosslinker can be present in amounts ranging from 0.1% to 50%, such as 10% to 35% or 15% to 25% based on the weight of the composition.

Optionally, the coating composition comprises polyisocyanate (e.g., water dispersible polyisocyanate, etc.). "Water dispersible" and like terms, when used in conjunction with polyisocyanate, refer to polyisocyanate dissolved or dispersed in aqueous phase. In order to utilize certain polyisocyanates in aqueous embodiments of the coating compositions, it may be necessary to modify the polyisocyanates to make them water dispersible. Techniques for modifying polyisocyanates to make them water dispersible are well known in the art. Suitable water dispersible polyisocyanates include multifunctional isocyanates and diisocyanates. Suitable multifunctional isocyanates include a wide variety of monomeric and oligomeric polyfunctional isocyanates. Examples include the biuret adduct of 3 molecules of a diisocyanate, the adduct of an at least trifunctional polyol with 1 molecule of a diisocyanate per hydroxyl equivalent, isocyanurate group-containing compounds, 1,3,5-triisocyanatobenzene, 2,4,6-triisocyanatoluene, and uretdione. In some embodiments, the crosslinking agent is selected from polyaziridine, polycarbodiimide or combinations thereof.

However, in some embodiments, the polyisocyanate is not water dispersible and/or nonblocked. For example, the compositions may comprise a blocked polyisocyanate. The blocked polyisocyanates do not react with polyols or polyamines at room temperature. Rather, these compounds dissociate the blocking agent at baking temperatures to regenerate the reactive isocyanate groups and allow crosslinking reactions to occur. As the solvent evaporates during curing and the blocked polyisocyanate becomes reactive with the secondary polymer, evaporation may have less effect on the secondary polymer domains of the resultant film. Additionally, the blocked isocyanate may contribute to the polyurethane crosslinking as well following migration into the polyurethane particles, as well as potential binding of the secondary polymer domains to the polyurethane domains. This may have an effect on the resultant film structure and benefits provide thereby. In some embodiments, the secondary polymer may have a weight ratio to the blocked polyisocyanate of 1:1 to 100:1 (e.g., 1:1 to 20:1, 1:1 to 50:1, etc.).

The coatings of the present invention can further comprise one or more additives typically added in the art. Such additives can include colorants, plasticizers, anti-oxidants, hindered amine light stabilizers, flame retardants, UV light absorbers and stabilizers, surfactants, flow control agents, thixotropic agents, fillers, organic cosolvents, reactive diluents, catalysts, grind vehicles, and other customary auxiliaries.

In Some Embodiments, the Coating Composition Comprises:
(a) 50% to 99% polyurethane by weight of the composition;
(b) 0.1% to 10% secondary polymer by weight of the composition;
(c) 0.1% to 5% blocked polyisocyanate by weight of the composition; and
(d) 0.1% to 5% crosslinking agent by weight of the composition.

The coating composition may further comprise 0.1% to 5% ammonium salt by weight of the composition. In some embodiments, the composition comprises 0.1% to 10% colorant by weight of the composition and/or 0.1% to 10% flame retardant by weight of the composition.

The various characteristics of the composition and the resultant cured film may also be altered through changes of the weight ratio of polyurethane to secondary polymer. In some embodiments, the weight ratio of said polyurethane particles to said secondary polymer is between 150:1 to 1:1 (e.g., 100:1 to 10:1, 100:1 to 50:1, 50:1 to 1:1, 10:1 to 1:1, 20:1 to 10:1, 30:1 to 20:1, 40:1 to 30:1, 50:1 to 40:1, 60:1 to 70:1, 80:1 to 90:1, 100:1 to 90:1, 120:1 to 80:1, 120:1 to 40:1, 120:1 to 1:1, 80:1 to 1:1, 80:1 to 40:1, 40:1 to 1:1, etc.).

In certain embodiments, the composition comprises:
(a) 30% to 99% polyurethane by weight of the composition; and
(b) 0.1 to 20% secondary polymer by weight of the composition.

Typically, the cured coating compositions may be cured through evaporation of the solvent. In some embodiments, the coating compositions are cured for 2-3 minutes at a temperature of more than 150° F.

In some embodiments, the film may be monolithic coating. In certain embodiments, the film and/or coated substrate has a low porosity for air or is non porous. The Frazier Air Permeability is an air permeability measurement typically made by passing a certain volume of air through a certain volume of a material (e.g., the film, a coated substrate, etc.) under a low pressure differential. The greater volume of air passed through indicates a higher air permeability. In some embodiments, the film has a Frazier Air Permeability of less than 1 ft$^3$/min (e.g., less than 0.5 ft$^3$/min, less than 0.1 ft$^3$/min, less than 0.05 ft$^3$/min, etc.). In some embodiments, the film is nonporous and waterproof.

Methods of measuring these benefits are well known. For example, the moisture vapor transmission rate may be determined by ASTM E96. In some embodiments, the MVTR is determined at greater than 80° F. (e.g., between 95° F. and 105° F., 100° F., etc.) and greater than 80% humidity (e.g., greater than 90% humidity, 90% humidity, etc.). The coated substrates may have an MVTR of at least 2,000 g/cm². Waterproofness may be measured with ASTM F 903-10 or ASTM D 751. In some embodiments, the waterproofness may be measured by placing a square 1"×1" tube over a piece of the coated substrate, filling the tube with water, and measuring the height of water within the tube prior to leakage through the coated substrate. In such a measurement, the coated substrate may have a waterproofness of greater than 5,000 mm or greater than 10,000 mm or greater than 15,000 mm or greater than 20,000 mm.

The coating compositions used according to the present invention are suitable for producing any type of coating, and are particularly suitable as topcoats on substrates. In certain embodiments, the coating compositions may be used to form one or more internal membrane layers in multilayer laminates or one or more interior layers in multilayer surface coatings. In other embodiments, the coating compositions may be used to form tie-coat or adhesive layers in laminates. Multilayer laminates are also provided comprising one or more cured films produced from the coating compositions described herein.

In one embodiment, the coatings of the present invention can be used as a single application coating or monocoat. In another embodiment, the coating can be used as one or more of a multiple layer coating in which each coat may contain the same or different polyurethanes and/or additives. The coatings of the present invention can be used alone or in combination with other coatings. In certain embodiments, it may be desirable to use an adhesion promoter layer on the substrate to be coated. In certain embodiments, it may be desired to apply to the substrate one or more coatings described above in a design or pattern. Such designs and/or patterns can use one color, or two or more colors of the coatings described above. In certain embodiments, it may be desired to apply one or more coatings to substantially all of the substrate. In this manner, a color or colors can be imparted to the substrate.

The coating compositions used according to the present invention can be applied to flexible substrates, including textiles, in any known manner such as brushing, spraying, rolling, roll coating, slot coating and/or dipping. The coatings can also be applied by any known manner of dying, printing, or coloring, such as silk-screening, ink-jet printing, jet dying, jet injection dying, transfer printing and the like. Such methods can be computer controlled, as will be understood by one skilled in the art.

The cured coating compositions may be attached to the surface of a material (e.g., a fabric, etc.) to form a coated composite substrate with enhanced benefits as compared to the substrate alone. In some embodiments, the cured coating compositions are attached the material surface after curing via an adhesive layer therebetween.

Coated substrates are also provided, wherein the coated substrate comprises a material (e.g., fabric, etc.) and a cured coating composition attached to the surface of the material. Typically, these coated substrates have a comparable breathability as compared to the uncoated substrate (e.g. between 0% and 30% MVTR change at 90° F. and 90% humidity, between 0% and 10% MVTR change at 90° F. and 90% humidity). In some embodiments, the coated substrate is waterproof, while an otherwise identical uncoated substrate is not waterproof (by which is meant that water is absorbed and passes through the uncoated substrate upon contact).

Multiple coating compositions may be used on the coated substrate. In some embodiments, the coated substrate may have or more two cured films affixed thereto. In some embodiments, each of the two or more cured films comprise different polyurethane particles.

The curing of these coatings can comprise a flash at ambient or elevated temperatures followed by a thermal bake in order to obtain optimum properties. The coatings of the present invention are typically deposited on the flexible substrate to a thickness of from 0.1 to 3 mils. In one embodiment, the coating is deposited to a thickness of from 0.5 to 1.0 mils.

The curable coating compositions may be applied according to known techniques to the textile fabric substrates. These include spraying, gravure coating, bar coating, coating by knife-over-roller, coating by knife-over-air, padding and screen-printing. It is preferred that the composition is applied by a knife-over-air or knife-over-roller coating method. It is also preferred that the composition is applied to a coat-weight prior to curing of at least 0.5 oz/yd² (e.g., greater than 3.5 oz/yd², greater than 2 oz/yd², etc.). In some embodiments, the total dry weight of the one or more coatings is greater than 1 oz/yd² (e.g., greater than 2 oz/yd², greater than 3 oz/yd², between 3.5 oz/yd² and 4.5 oz/yd², etc.). In some embodiments, each coating has a dry weight greater than 1 oz/yd² (e.g., greater than 2 oz/yd², greater than 3 oz/yd², between 3.5 oz/yd² and 4.5 oz/yd², etc.). In some embodiments, the coating thickness is from 0.75 to 5 oz/yd² (e.g., 0.75 oz/yd² to 4 oz/yd², etc.). In order to make the compositions easily applicable to the textile fabric, it is preferred that the viscosity of the composition is less than 100,000 cps (e.g., less than 50,000 cps, less than 35,000 cps, less than 10,000 cps, between 1,500 cps and 4,000 cps, between 1,000 cps and 4,500 cps, between 1,500 cps and 3,000 cps, between 20,000 cps and 30,000 cps, etc.). The viscosity may be measured at room temperature using a Brookfield viscometer at 12 rpm. In some embodiments, the viscosity of the coating composition (e.g., 200 mL of the coating composition, etc.) may be measured with a Brookfield Model DLV viscometer at 12 rpm using spindle #4 (guard leg omitted). Measurements may be taken after brief hand stirring and five spindle rotations.

In some embodiments, the textile fabric is scoured prior to application, in order to ensure good adhesion of the composition. In other embodiments, the fabric is not scoured, and the cured composition is attached to the fabric via an adhesive layer therebetween.

It is possible to apply one or more cured composition in multiple layers, which together fulfill the preferred criteria set out above. It is also possible to apply onto the coating composition a further coating, e.g. of a material providing low friction, or an additional textile fabric, whether woven or non-woven to improve the strength and/or the feel of the fabric.

The compositions according to the invention may be heat-cured and/or cured by electromagnetic radiation (radiation of accelerated electrons or "electron beam"). The compositions according to the invention may be used for covering or coating flexible supports, especially woven, knitted or nonwoven fibrous textiles, and preferably woven, knitted or nonwoven supports made of synthetic fibers (e.g., polyester or polyamide, etc.). Curing conditions for the coating are preferably at elevated temperatures over a period which will vary depending on the actual temperature used, for example more than 100° F. (e.g., 100° F. to 200° F., etc.) or more than 150° F. (e.g., 150° F. to 300° F., etc.) or more than 200° F. (e.g., 200° F. to 300° F., etc.). for a period of up to ten (10) minutes (e.g., up to one minute, up to two minutes, up to three minutes, up to four minutes, up to five minutes).

Textile substrates of the current invention may be of any known construction including a knit construction, a woven construction, a nonwoven construction, and the like, or combinations thereof. In certain embodiments, textile substrates may have a weight of between 0.1 and 200 oz/yd$^2$ (e.g., between 0.1 and 100 oz/yd$^2$, between 1 and 75 oz/yd$^2$, etc.). In some embodiments, the textile substrates may have a weight of between 2 oz/yd$^2$ and 12 oz/yd$^2$.

The material of the textile substrate may be synthetic fiber, natural fiber, man-made fiber using natural constituents, inorganic fiber, glass fiber or any blend thereof. Synthetic fibers may include polyester, acrylic, polyamide, polyolefin, polyaramid, polyurethane, or blends thereof. More specifically, polyester may include polyethylene terephthalate, polytrimethylene terephthalate, polybutylene terephthalate, polylactic acid, or combinations thereof.

The textile substrate may be formed from staple fiber, filament fiber, slit film fiber, or combinations thereof. The fiber may be exposed to one or more texturing processes. The fiber may then be spun or otherwise combined into yarns, for example, by ring spinning, open-end spinning, air jet spinning, vortex spinning, or combinations thereof.

In preferred embodiments, the substrate is fabric. The fabric may comprise a fiber network, for example, formed from woven, knitted, and/or non-woven fibers. In some embodiments, the fibers are coated to provide a barrier to liquid contaminants (e.g., coated with polyurethane, etc.). In some embodiments, the fabric comprises thermoplastic fibers or monofilaments. The fabric may be a polyester mesh, a nylon mesh, or a combination thereof. In some embodiments, the substrate comprises plastic (e.g., polypropylene plastic, etc.). In some embodiments, the substrate comprises a biaxially-oriented polypropylene film.

In some embodiments, the substrate is a transfer element (e.g., a transfer sheet capable of being separated from said cured coating composition after said coating composition is cured on said transfer sheet). In other embodiments, the substrate is a fabric.

The cured film may be affixed to the substrate by an adhesive intermediate layer between said cured coating composition and said substrate. In some embodiments, the film may be cured on the substrate itself with an adhesive present in the composition.

The coating compositions are able to provide a moisture vapor transmission rate comparable to the uncoated substrate. In some embodiments, the MVTR of the coated substrate has a MVTR of 1500 to 3000 g/m$^2$/24 hours (e.g., 2000 to 2500 g/m$^2$/24 hours, etc.). The MVTR may be measured by ASTM E 96-95 at 100° F. and 90% RH.

In some embodiments, the coated substrate comprises a substrate and a first and second coating composition, wherein the first and second coating compositions are coated on said substrate, and said first coating composition comprises different polyurethane particles than said second coating composition. The first and second coating compositions may have been cured, and the cured first coating composition may be adhesively attached to said substrate via an intermediate adhesive layer between said first coating composition and said substrate. In some embodiments, the second coating composition is coated and cured on a cured film of said first coating composition. In certain embodiments, the first coating composition comprises polycarbonate polyurethane and polycarbonate polyether polyurethane. In preferred embodiments, the second coating composition comprises polycarbonate polyurethane.

Typically, the methods of coating a substrate may comprise spreading the coating composition onto a substrate and optionally heating the substrate and the coating composition to cure said composition on said substrate. The coating composition may be spread on said substrate with a thickness greater than 2 mil. In some embodiments, the coating composition is spread on said substrate with a thickness between 1 and 7 mil (e.g., between 2 and 6 mil). In some embodiments, the coating composition is spread on said substrate with a wet weight of greater than 2 oz/yd$^2$.

In Some Embodiments, the Method of Coating a Substrate May Comprise:
(a) spreading a coating composition onto a transfer sheet;
(b) curing the coating composition on the transfer sheet;
(c) removing the transfer sheet from the cured coating composition; and
(d) attaching the cured coating composition to said substrate with an intermediate adhesive layer between the cured coating composition and the substrate.

A Method of Coating a Transfer Sheet is Also Provided Comprising:
(a) spreading a first coating composition onto a transfer sheet;
(b) curing the first composition on said transfer sheet to form a topcoat composition;
(c) spreading a second composition onto said cured topcoat composition; and
(d) curing said second composition on said cured first composition. In some embodiments, the first and second compositions are each different coating compositions according to the invention. For example, the first composition may comprise polycarbonate polyurethane particles and the second composition may comprise polycarbonate polyurethane and polycarbonate polyether polyurethane particles. In some embodiments, the first and second composition is spread to a wet weight greater than 1.5 oz/yd$^2$. In some embodiments, the second composition may be spread to a wet weight greater than 3 oz/yd$^2$. In some embodiments, the cured first coating composition and cured second composition each have a dry weight between 3.5 and 4.5 oz/yd$^2$.

In some embodiments, the method of coating a transfer sheet may be used to coat a different substrate. For example, the method of coating a substrate may comprise:
(a) spreading a topcoat composition onto a transfer sheet;
(b) curing the topcoat composition on the transfer sheet;
(c) spreading a midcoat composition onto the cured topcoat composition;
(d) curing the midcoat composition on said cured topcoat composition to form a cured coating composite on said transfer sheet;
(e) removing said transfer sheet; and
(f) attaching said cured coating composite to said substrate with an intermediate adhesive layer between said cured midcoat composition and said substrate.

In some embodiments, the topcoat composition comprises polycarbonate polyurethane particles and polycarbonate polyether polyurethane particles and said second midcoat composition comprises polycarbonate polyurethane particles. The topcoat may be spread to a wet weight greater than 3.5 oz/yd$^2$ and the midcoat may be spread to a wet weight greater than 2 oz/yd$^2$. In some embodiments, the cured first and second precoat have a dry weight between 3.5 and 4.5 oz/yd$^2$.

Methods of manufacturing coating compositions are also provided, comprising combining a dispersion of said polyurethane particles with an aqueous solution (e.g., dispersion) of secondary polymers. In preferred embodiments, the dispersion of polyurethane particles is an aqueous dispersion. The aqueous polyurethane dispersion may have a pH between 6.5 and 8.5. Preferably, the aqueous dispersion of polyurethane particles may further comprise blocked polyisocyanate, ammonium hydroxide. In some embodiments, the aqueous solution of polymers further comprises ammonium hydroxide, a crosslinking agent (e.g., polyaziridine crosslinkers, polycarbodiimide crosslinkers, etc.), and combinations thereof. Typically, the aqueous dispersion of polymers has a pH between 10 and 11.

EXAMPLES

These Examples are provided for the purpose of illustration only, and the disclosure is not limited to these Examples, but rather encompasses all variations that are evident as a result of the teachings provided herein. Unless noted otherwise, the starting materials for the synthesis described herein were obtained from commercial sources or known synthetic procedures and were used without further purification.

Example 1: Exemplary Coating Compositions

The formulations of two compositions (Comp. A and Comp. B) are shown in Table 1. Table 1 identifies the weight percent of each component by weight of the phase itself (wt % in phase) and by weight of the composition after the two phases have been added (wt % in final comp). The coating compositions comprise a polyurethane phase and a secondary polymer phase.

TABLE 1

| Component | Comp. A (wt % in phase/ wt % in final comp) | Comp. B (wt % in phase/ wt % in final comp) |
|---|---|---|
| Polyurethane Phase | | |
| Impranil DLC-F | 95.5%/72.8% | 46.2%/32.3% |
| Impranil DLU | — | 45.4%/31.8% |
| Imprafix 2794 XP | 0.5%/0.4% | 0.5%/0.3% |
| TegoGlide 440 | 0.2%/0.2% | — |
| Pigment | 3.8%/2.9% | 6.4%/4.4% |
| Airase 5200 | — | 1.5%/1.1% |
| Secondary Polymer Phase | | |
| Polyethylenimine Solution, 50% | 25.5%/6.0% | 20.2%/6.1% |
| Ammonium Hydroxide, 29% | 35.8%/8.5% | 28.4%/8.5% |
| Isopropanol, 99% | 27.2%/6.5% | — |
| Rheolate 350D | 7.7%/1.8% | 3.8%/1.1% |
| PZ-28 Polyaziridine | 3.8%/0.9% | 3.0%/0.9% |
| Melapur MC 25 | — | 44.6%/13.4% |

Each phase was prepared separately. The polyurethane dispersions were mixed in a plastic, or plastic-lined mixing vessel equipped with a means for agitation (cowls type blade). The remaining components of the polyurethane phase were then separately added directly into the polyurethane dispersion with agitation of the vessel. The polyurethane phase is typically mixed from three (3) to five (5) minutes to ensure batch uniformity. Physical parameters of Polyurethane Phase A (i.e., the polyurethane phase of Composition A) and Polyurethane Phase B (i.e., the polyurethane phase of Composition B) are detailed in Table 2. The mixture is then filtered through a 75 micron filter bag into a separate clean, dry plastic or plastic-lined container.

TABLE 2

| Component | Polyurethane Phase. A | Polyurethane Phase B |
|---|---|---|
| Visual Appearance (wet) | Dark blue liquid free of particulate matter | Dark blue liquid free of particulate matter |
| Visual Appearance (4 mil wet film on Mylar or BOPP sheet, oven dried for two minutes at 250° F. | High gloss dark blue film, free of particulates | Semi-gloss, opaque dark blue film, free of particulates |
| pH | 6.5 to 8.5 | 6.5 to 8.5 |

The secondary polymer phases were made in another plastic or plastic lined mixing vessel equipped with agitation means. For Secondary Polymer Phase A (i.e., the secondary polymer phase of Composition A), each component was charged into the vessel and subsequently mixed with moderate agitation for one (1) to two (2) minutes. For Secondary Polymer Phase B (i.e., the secondary polymer phase of Composition B), the polyethylenimine solution and ammonium hydroxide were placed in the vessel and mixed. The Melapur MC 25 Flame Retardant was then gradually added followed by increased agitation for one (1) to three (3) minutes to ensure complete breakdown of flame retardant agglomerates. The Rheolate 350D Thickener and PZ-28 Polyaziridine Crosslinker were then added to the mixture while maintaining agitation for one (1) to two (2) minutes. Physical parameters of Secondary Polymer Phase B are detailed in Table 3. After agitation, the mixtures were then filtered through a 75 micron filter bag into a separate clean, dry or plastic-lined container.

TABLE 3

| Component | Secondary Polymer Phase B |
|---|---|
| Visual Appearance (wet) | Off-white, high gloss viscous liquid, free of lumps and particulates |

The two phases were then mixed together. Composition A comprised 76% Polyurethane Phase A by weight of the composition and 24% Secondary Polymer Phase A. Composition B comprised 70% Polyurethane Phase B and 30% Secondary Polymer Phase B by weight of the composition. To a plastic or plastic-lined vessel equipped with a high-speed mixer and a Cowles-types mixing blade, the Polyurethane Phase and the Secondary Polymer Phase were charged. The Polyurethane Phase was placed first in the vessel with mixing or without mixing. The two phases were mixed at moderate speed for one (1) to two (2) minutes to achieve a smooth, uniform consistency of the composition. Physical parameters of Composition A and Composition B (i.e., the polyurethane phase of Composition B) are detailed in Table 4.

TABLE 4

| Component | Polyurethane Phase. A | Polyurethane Phase B |
|---|---|---|
| Visual Appearance (wet) | Blue slightly viscous liquid free of particulate matter. | Dark viscous liquid free of particulate matter |
| Visual Appearance (4 mil wet film on Mylar or BOPP sheet, oven dried for two minutes at 250° F.) | High gloss dark blue film, free of particulates | Dark blue opaque film, free of particulates |
| pH | 10 to 11 | 10 to 11 |
| Batch Viscosity (cps; Brookfield at 12 rpm, sample cooled to RT) | 1,500 to 3,000 | 20,000 to 30,000 |

Example 2: Coating Procedure of a Fabric

The coating procedure described below uses Composition A as a topcoat and Composition B as a midcoat. However, such designation of these compositions is not intended to be restrictive.

Composition A was applied to a BOR Supermatte casting power via Reverse Roll to a target wet weight of 2.10 oz/yd$^2$ on a roller coater operating at a rate of 5 yards/min. The topcoat coating layer was then dried without blistering in two different oven zones at a temperature of 200° F. to 225° F. Following drying of the topcoat coating layer, Composition B was then applied over the topcoat layer via Knife-over-Roll to a target wet weight of 3.95 oz/yd$^2$. The midcoat layer was then dried without blistering in four oven zones. The first three oven zones were set at 200° F., and the fourth oven zone was set at 225° F.

A reactive hot melt adhesive was directly applied to the midcoat surface and the adhesive-printed web on the midcoat was then combined with the technical surface of Milco Nylon Knit. The coated product was then cured on suspended, wound rolls for at least 48 hours under ambient conditions. The sufficiently aged laminate product (nylon, adhesive and two cured coats) were then heated in eight drying zones each maintained at 275° F. This final curing pass has conditions sufficient to unblock the blocked isocyanate crosslinker.

Example 3: Properties of Coated Fabrics

Figure 1B:
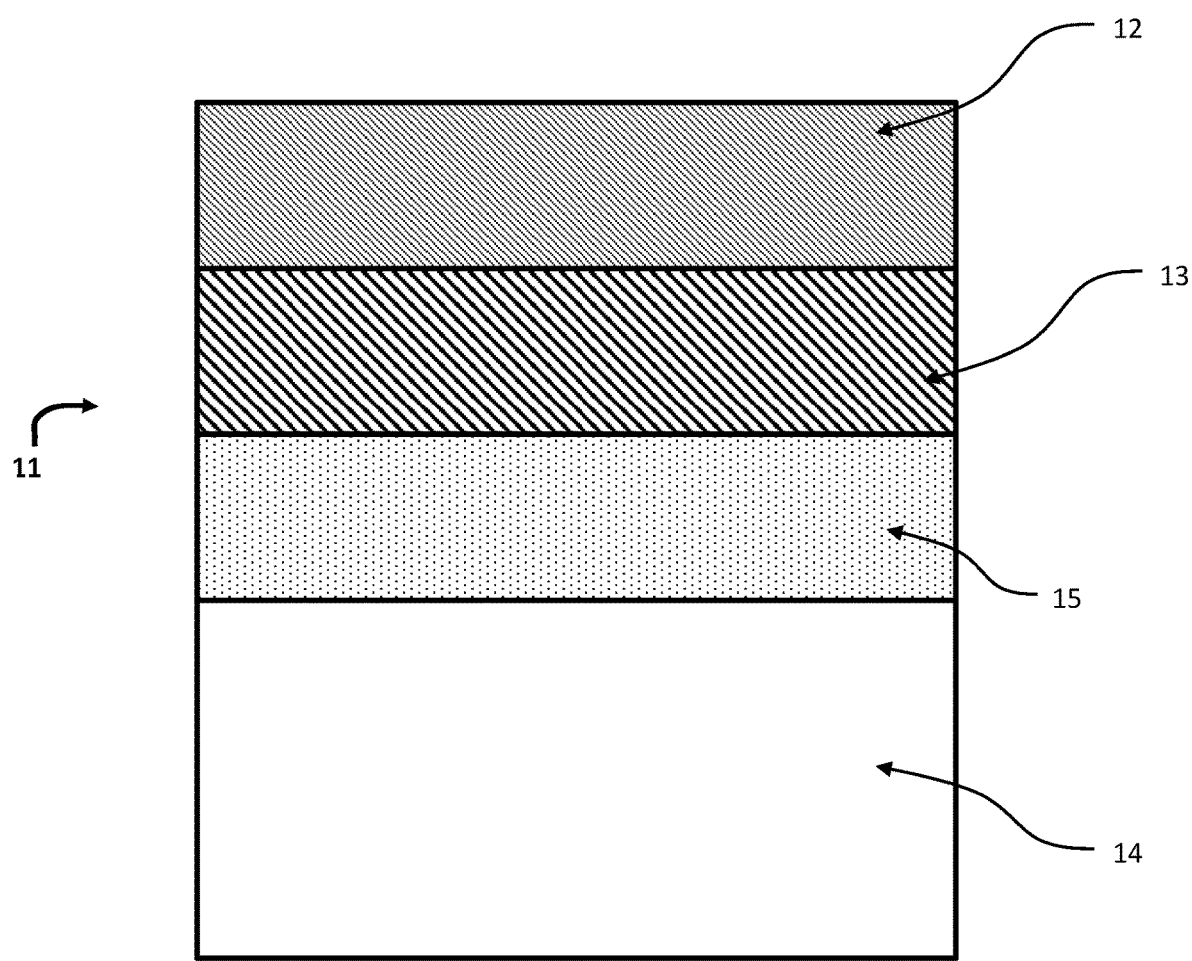
FIG. 1B shows the cross section of Fabric S17540 (21) used in the oxidative damage test of Example 3.
Figure 1C:
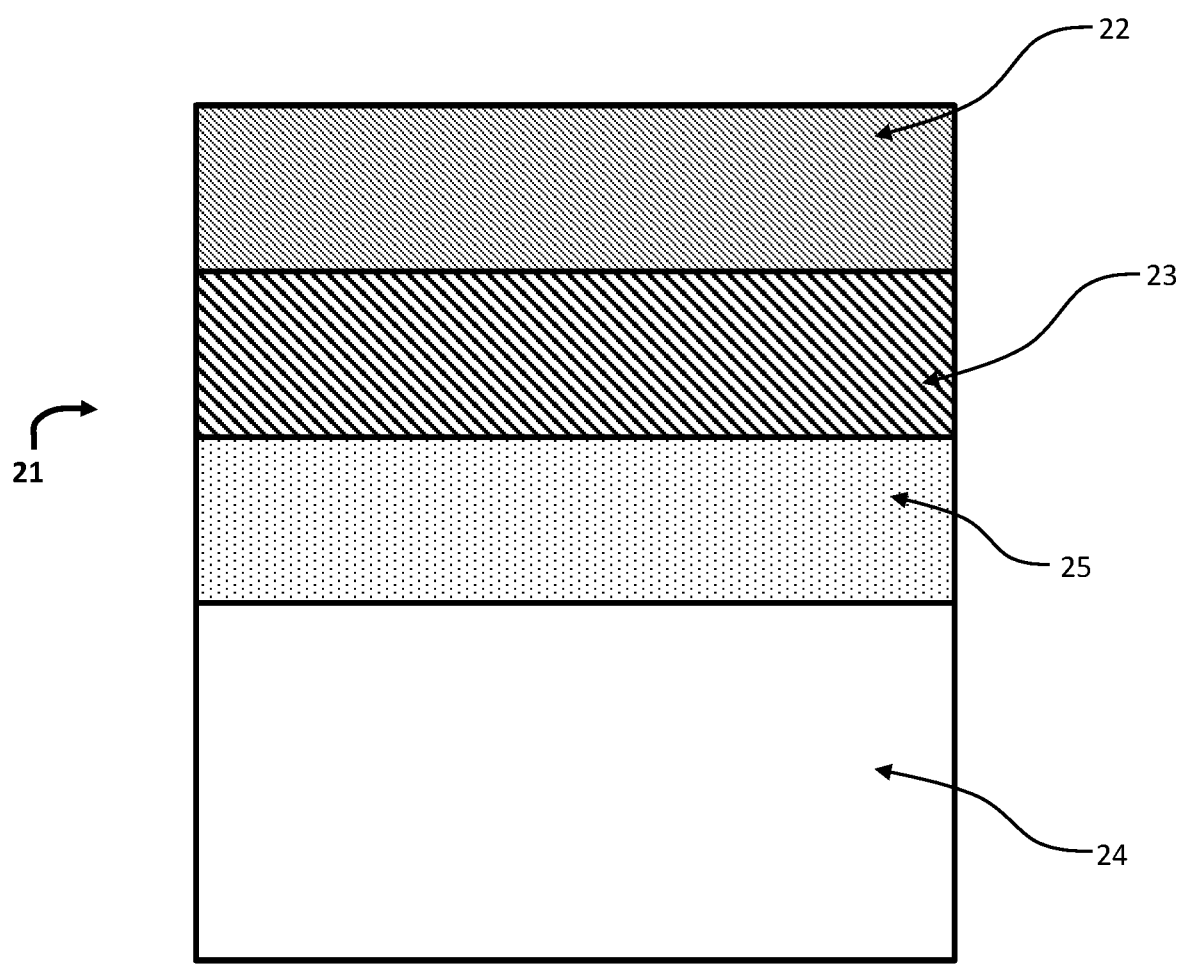
FIG. 1C shows the cross section of Fabric and S17541 (11) used in the oxidative damage test of Example 3. With regard to FIGS. 1A-1C, the coating compositions for the polyether polyurethane coated fabric did not comprise secondary polymer in either the topcoat or midcoat, Fabric S17540 had a PU/secondary polymer topcoat, but a nanofiber polyurethane midcoat, and Fabric S17541 had PU/secondary polymer midcoat and topcoat.

Knit substrates were coated with inventive compositions. A comparison of the cross section of coated substrates is shown in FIGS. 1A-1C. FIG. 1A shows a cross section of an exemplary polyether polyurethane coated fabric 1 having topcoat 2 made from a hydrophilic polyether polyurethane compound from solution coated at 0.65 oz/yd$^2$, an adhesive layer 3 made from a hydrophilic polyether polymer compound from solution coated at 1.20 oz/yd$^2$, and a woven substrate 4 made of nylon twill with a weigh of 3.00 oz/yd$^2$. The S17541 Fabric 11 illustrated in FIG. 1B had topcoat 12 and midcoat layer 13 coatings comprising polyurethane/secondary polymer construction described herein. The secondary polymer used for these coating compositions was polyethyleneimine. These were attached to knit substrate 14 made of nylon tricot with a weight of 4.30 oz/yd$^2$ by a adhesive layer 15 in a dot geometry made of a polyurethane reactive hot melt. The S17540 Fabric 21 had an inventive PU/PEI topcoat layer 21 with a weight of 0.80 oz/yd$^2$ and an electrospun nanofiber polyurethane midlayer 22 with a weight of 0.20 oz/yd$^2$ as shown in FIG. 1C. These coating compositions were attached to the knit substrate 23 made of nylon tricot with a weight of 4.30 oz/yd$^2$ using a PU Reactive Hot Melt Adhesive Layer 25 in a dot geometry and a weight of 0.50 oz/yd$^2$. The comparative polyether polyurethane coated fabric was made from coating compositions comprising organic solvent borne polyurethane polymers. All coating compositions comprise color pigments, flame retardant additives, crosslinking agents (e.g., polyaziridine crosslinkers, polycarbodiimide crosslinkers, etc.), and surface active ingredients. Fabric S17541 had an MVTR of 2228 g/m$^2$/24 hours as measured by ASTM E 96-95 at 100° F. and 90% RH. The comparative polyether polyurethane coated fabric had an average MVTR of 2100 g/m$^2$/24 hours as measured by ASTM E 96-95 at 100° F. and 90% RH.

SPECIFIC EMBODIMENTS

Non-limiting specific embodiments are described below each of which is considered to be within the present disclosure.

Specific Embodiment 1. A coating composition for forming a polymeric coating on a substrate comprising:
(a) a polymeric film former dispersed in a liquid media, and
(b) a secondary polymer;
wherein said secondary polymer is present in an amount to increase the moisture vapor transmission rate of a film produced (e.g., the film produced by curing said coating composition on a substrate such as nylon) from said coating composition as compared to an otherwise identical film produced from a coating composition without said secondary polymer.

Specific Embodiment 2. The coating composition according to Specific Embodiment 1, wherein said secondary polymer is a hydrophilic polymer.

Specific Embodiment 3. The coating composition according to Specific Embodiment 1, wherein said secondary polymer comprises one or more polar monomer units.

Specific Embodiment 4. The coating composition according to Specific Embodiment 1, wherein said secondary polymer is selected from polyethyleneimine, polyethyleneoxide, polyvinyl alcohol, or polyvinyl pyrollidone.

Specific Embodiment 5. The coating composition according to Specific Embodiment 1, wherein said secondary polymer is polyethyleneimine.

Specific Embodiment 6. The coating composition according to Specific Embodiment 1, comprising:
(a) a dispersion of polyurethane particles in liquid media, wherein said polyurethane particles are present in said dispersion in an amount sufficient to coalesce to form a continuous film upon removal of said media (e.g., by evaporation, by forced evaporation, etc.); and
(b) a secondary polymer soluble or dispersible in said media.

Specific Embodiment 7. The coating composition according to any one of Specific Embodiments 1-6, wherein said cured film has a similar (e.g., within about ±30%, within about ±20%, within about ±10%, etc.) waterproofness as compared to an otherwise identical film without said secondary polymer.

Specific Embodiment 8. The coating composition according to any one of Specific Embodiments 1-6, wherein said media comprises water.

Specific Embodiment 9. The coating composition according to any one of Specific Embodiments 1-6, wherein a major portion of said media comprises water (e.g., said media comprises at least 50% water or at least 75% water or at least 90% or at least 95% water by weight of said polymeric film former dispersed in a liquid media, etc.).

Specific Embodiment 10. The coating composition according to any one of Specific Embodiments 1-6, wherein said media is water.

Specific Embodiment 11. The coating composition according to any one of Specific Embodiments 1-10, wherein said polymeric film former is a colloidal dispersion in said liquid media.

Specific Embodiment 12. The coating composition according to any one of Specific Embodiments 1-11, wherein said secondary polymer is hydrophilic.

Specific Embodiment 13. The coating composition according to any one of Specific Embodiments 6-12, wherein said polyurethane particles are electrostatically attracted to said secondary polymer.

Specific Embodiment 14. The coating composition according to any one of Specific Embodiments 6-13, wherein said polyurethane particles comprise anionic polyurethane.

Specific Embodiment 15. The coating composition according to Specific Embodiment 14, wherein said anionic polyurethane comprises carboxylate groups, ether groups, sulfonate groups, or combinations thereof.

Specific Embodiment 16. The coating composition according to any one of Specific Embodiments 6-15, wherein said polyurethane particles comprise polyurethane comprising polycarbonate moieties.

Specific Embodiment 17. The coating composition according to Specific Embodiment 16, wherein said polyurethane further comprises ether moieties.

Specific Embodiment 18. The coating composition according to any one of Specific Embodiments 6-17, wherein said polyurethane particles comprise aliphatic polycarbonate polyurethane.

Specific Embodiment 19. The coating composition according to any one of Specific Embodiments 6-18, further comprising a crosslinking agent.

Specific Embodiment 20. The coating composition according to any one of Specific Embodiments 6-19, wherein said crosslinking agent is selected from polyaziridine, polycarbodiimide or combinations thereof.

Specific Embodiment 21. The coating composition according to any one of Specific Embodiments 6-20, wherein said secondary polymer comprises monomer units comprising primary and secondary amine groups.

Specific Embodiment 22. The coating composition according to any one of Specific Embodiments 1-21, further comprising an ammonium salt.

Specific Embodiment 23. The coating composition according to Specific Embodiment 22, wherein the weight ratio of said secondary polymer and said ammonium salt is between 10:1 and 1:10.

Specific Embodiment 24. The coating composition according to any one of Specific Embodiments 1-23, wherein said secondary polymer is polyethylenimine.

Specific Embodiment 25. The coating composition according to any one of Specific Embodiments 1-24, wherein said secondary polymer has a molecular weight of greater than 1,000 g/mol (e.g., greater than 20,000 g/mol, greater than 50,000 g/mol, greater than 100,000 g/mol, etc.).

Specific Embodiment 26. The coating composition according to Specific Embodiment 1, having a viscosity less than 4,000 cps at room temperature in a Brookfield Model DLV viscometer at 12 rpm with spindle #4.

Specific Embodiment 27. The coating composition according to Specific Embodiment 1, further comprising a blocked polyisocyanate.

Specific Embodiment 28. The coating composition according to Specific Embodiment 27, wherein said blocked polyisocyanate is present in an amount to react with said moieties of said secondary polymer to reduce said attraction to said media.

Specific Embodiment 29. The coating composition according to Specific Embodiment 27 or 28, wherein the weight ratio of said polymer to said blocked polyisocyanate is from 1:1 to 20:1.

Specific Embodiment 30. The coating composition according to any one of Specific Embodiments 1-29, further comprising a flame retardant and/or a colorant.

Specific Embodiment 31. The coating composition according to any one of Specific Embodiments 6-30, wherein the weight ratio of said polyurethane particles to said secondary polymer is between 150:1 to 1:1.

Specific Embodiment 32. The coating composition according to Specific Embodiment 6, wherein said composition comprises:
(a) 30% to 90% polyurethane by weight of the composition; and
(b) 0.1 to 20% secondary polymer by weight of the composition.

Specific Embodiment 33. The coating composition according to Specific Embodiment 6, wherein said composition comprises:
(a) 50% to 90% polyurethane by weight of the composition;
(b) 0.1% to 10% secondary polymer by weight of the composition;
(c) 0.1% to 5% blocked polyisocyanate by weight of the composition; and
(d) 0.1% to 5% crosslinking agent (e.g., polyaziridine crosslinkers, polycarbodiimide crosslinkers, etc.), by weight of the composition.

Specific Embodiment 34. A coating composition comprising polycarbonate polyurethane and polyethyleneimine.

Specific Embodiment 35. The coating composition according to Specific Embodiment 34, wherein 50% to 90% of said composition is said polycarbonate polyurethane by weight of said composition.

Specific Embodiment 36. The coating composition according to Specific Embodiment 34, wherein 1% to 10% of said composition is polyethyleneimine by weight of said composition.

Specific Embodiment 37. The coating composition according to Specific Embodiment 34, wherein 50% to 90% of said composition is said polycarbonate polyurethane and 1% to 10% of said composition is polyethyleneimine by weight of said composition.

Specific Embodiment 38. The coating composition according to any one of Specific Embodiments 34-37, wherein said coating composition may be cured to produce a film characterized with an MVTR of at least 2,000 g/cm$^2$.

Specific Embodiment 39. The coating composition according to any one of Specific Embodiments 34-38, wherein said coating composition may be cured to produce a film characterized by a waterproofness of greater than 5,000 mm.

Specific Embodiment 40. A cured coating composition for coating a material comprising the coating composition according to any one of Specific Embodiments 1-39, wherein said coating composition has been cured.

Specific Embodiment 41. The composition according to Specific Embodiment 40, wherein said coating composition has been cured for 2 minutes at more than 150° F.

Specific Embodiment 42. A coated substrate comprising a substrate selected from the group consisting of a textile, paper, or a transfer element, wherein said substrate has a coating composition according to any one of Specific Embodiments 1-39 deposited on one or more surfaces thereof.

Specific Embodiment 43. The coated substrate according to Specific Embodiment 42, wherein said coating composition has been cured to form a film.

Specific Embodiment 44. A coated substrate comprising a substrate and a first and second coating composition, wherein said first and second coating compositions are each a coating composition according to any one of Specific Embodiments 1-39, said first and second coating compositions are coated on said substrate, and said first coating composition comprises different polyurethane particles than said second coating composition.

Specific Embodiment 45. The coated substrate according to Specific Embodiment 44, wherein said first coating composition comprises polycarbonate polyurethane and polycarbonate polyether polyurethane.

Specific Embodiment 46. The coated substrate according to Specific Embodiment 45, wherein said second coating composition comprises polycarbonate polyurethane.

Specific Embodiment 47. The coated substrate according to any one of Specific Embodiments 44-46, wherein said first coating composition is different than said second coating composition.

Specific Embodiment 48. A method of coating a substrate comprising spreading a coating composition according to any one of Specific Embodiments 1-37 onto a substrate.

Specific Embodiment 49. The method according to Specific Embodiment 48, wherein said coating composition is spread on said substrate with a thickness greater than 2 mil.

Specific Embodiment 50. The method according to Specific Embodiment 48, wherein said coating composition is spread on said substrate with a thickness between 1 and 7 mil (e.g., between 2 and 6 mil, etc.).

Specific Embodiment 51. The method according to Specific Embodiment 48, wherein said coating composition is spread on said substrate with a wet weight of greater than 2 oz/yd$^2$.

Specific Embodiment 52. The method according to Specific Embodiment 48, further comprising heating said substrate and said coating composition to cure said coating composition on said substrate.

Specific Embodiment 53. A method of coating a substrate comprising:
(a) spreading a coating composition according to any one of Specific Embodiments 1-39 onto a transfer sheet;
(b) curing said coating composition on said transfer sheet;
(c) removing said transfer sheet from said cured coating composition; and
(d) attaching said cured coating composition to said substrate with an intermediate adhesive layer between said cured coating composition and said substrate.

Specific Embodiment 54. A method of coating a substrate comprising:
(a) spreading a topcoat composition onto a transfer sheet;
(b) curing said topcoat composition on said transfer sheet;
(c) spreading a midcoat composition onto said cured topcoat composition; and
(d) curing said midcoat composition on said cured topcoat composition to form a cured coating composite on said transfer sheet;
(e) removing said transfer sheet;
(f) attaching said cured coating composite to said substrate with an intermediate adhesive layer between said cured midcoat composition and said substrate;
wherein said topcoat and midcoat compositions are each a coating composition according to any one of Specific Embodiments 1-39.

Specific Embodiment 55. The method according to Specific Embodiment 54, wherein said topcoat composition comprises polycarbonate polyurethane particles and polycarbonate polyether polyurethane particles and said midcoat composition comprises polycarbonate polyurethane particles.

Specific Embodiment 56. The method according to Specific Embodiment 54, wherein said first precoat is spread to a wet weight greater than 3.5 oz/yd$^2$.

Specific Embodiment 57. The method according to Specific Embodiment 54, wherein said first precoat is spread to a wet weight greater than 2 oz/yd$^2$.

Specific Embodiment 58. The method according to Specific Embodiment 54, wherein said cured first and second precoat have a dry weight between 3.5 and 4.5 oz/yd$^2$.

Specific Embodiment 59. A method of increasing the breathability of a cured film of a coating composition comprising a film former, wherein said method comprises adding an amount of secondary polymer to said coating composition such that said secondary polymer is capable of preventing complete coalescence of said film former upon curing.

As various changes can be made in the above-described subject matter without departing from the scope and spirit of the present invention, it is intended that all subject matter contained in the above description, or defined in the appended claims, be interpreted as descriptive and illustrative of the present invention. Many modifications and variations of the present invention are possible in light of the above teachings. Accordingly, the present description is intended to embrace all such alternatives, modifications and variances which fall within the scope of the appended claims.

The invention claimed is:

1. A coating composition for forming a polymeric coating on a substrate comprising:
(a) a dispersion of polyurethane particles in liquid media, wherein said polyurethane particles are present in said dispersion in an amount sufficient to coalesce to form a continuous and non-porous film upon removal of said media, and
(b) a secondary polymer;
dispersed in the liquid media; wherein said secondary polymer is polyethyleneimine and has a molecular weight of greater than 100,000 g/mol;
wherein the substrate is a woven or knitted fabric and said substrate with said polymeric coating has a moisture vapor transmission rate within 0% and 30% of an otherwise identical uncoated substrate at 90° F. and 90% humidity.

2. The coating composition according to claim 1, wherein said cured film has a waterproofness within ±30% of the waterproofness of an otherwise identical film without said secondary polymer.

3. The coating composition according to claim 1, wherein said polyurethane particles comprise carboxylate groups, ether groups, sulfonate groups, or combinations thereof.

4. The coating composition according to claim 1, wherein said polyurethane particles comprise aliphatic polycarbonate polyurethane.

5. The coating composition according to claim 1, wherein said secondary polymer has a molecular weight of from 200,000 g/mol to 1,500,000 g/mol.

6. The coating composition according to claim 1, wherein the weight ratio of said polyurethane particles to said secondary polymer is between 150:1 to 1:1.

7. The coating composition according to claim 1, wherein said composition comprises:
   (a) 30% to 90% polyurethane by weight of the composition; and
   (b) 0.1 to 20% secondary polymer by weight of the composition.

8. The coating composition according to claim 1, wherein said composition comprises:
   (a) 50% to 90% polyurethane by weight of the composition;
   (b) 0.1% to 10% secondary polymer by weight of the composition;
   (c) 0.1% to 5% blocked polyisocyanate by weight of the composition; and
   (d) 0.1% to 5% crosslinking agent by weight of the composition.

9. A coating composition for forming a polymeric non-porous coating on a substrate comprising polycarbonate polyurethane and polyethyleneimine;
   wherein the substrate is a woven or knitted fabric.

10. The coating composition according to claim 9, wherein 50% to 90% of said composition is said polycarbonate polyurethane and 1% to 10% of said composition is polyethyleneimine by weight of said composition.

11. A coated substrate, wherein said substrate is a woven or knitted fabric and has a non-porous coating formed from the coating composition according to claim 1 deposited on one or more surfaces thereof,
   wherein said coated substrate has a moisture vapor transmission rate within 30% of an otherwise identical uncoated substrate at 90° F. and 90% humidity.

12. A coated substrate comprising a substrate and a first and second coating composition, wherein said first and second coating compositions are each a non-porous coatings formed independently from a coating composition according to claim 1, said first and second coating compositions are coated on said substrate, and said first coating composition comprises different polyurethane particles than said second coating composition; wherein said substrate is a woven or knitted fabric.

13. The coated substrate according to claim 12, wherein said first coating composition comprises polycarbonate polyurethane and polycarbonate polyether polyurethane.

14. The coated substrate according to claim 13, wherein said second coating composition comprises polycarbonate polyurethane.

15. A method of coating a substrate comprising spreading a coating composition according to claim 1 onto a substrate.

16. A method of coating a substrate comprising:
   (a) spreading a coating composition according claim 1 onto a transfer sheet;
   (b) curing said coating composition on said transfer sheet;
   (c) removing said transfer sheet from said cured coating composition; and
   (d) attaching said cured coating composition to said substrate with an intermediate adhesive layer between said cured coating composition and said substrate.

17. A method of coating a substrate comprising:
   (a) spreading a topcoat composition onto a transfer sheet;
   (b) curing said topcoat composition on said transfer sheet;
   (c) spreading a midcoat composition onto said cured topcoat composition; and
   (d) curing said midcoat composition on said cured topcoat composition to form a cured coating composite on said transfer sheet;
   (e) removing said transfer sheet;
   (f) attaching said cured coating composite to said substrate with an intermediate adhesive layer between said cured midcoat composition and said substrate;
   wherein said topcoat and midcoat compositions are each a coating composition according to claim 1.

18. The method according to claim 17, wherein said topcoat composition comprises polycarbonate polyurethane particles and polycarbonate polyether polyurethane particles and said midcoat composition comprises polycarbonate polyurethane particles.

19. The coating composition according to claim 1, wherein said polyurethane particles comprise anionic polyurethane.

20. The coated substrate according to claim 11, wherein said coated substrate has a moisture vapor transmission rate of 1500 to 3000 g/m$^2$/24 hours.

* * * * *